(12) United States Patent
Tsukada

(10) Patent No.: US 12,219,105 B2
(45) Date of Patent: Feb. 4, 2025

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Nobuyuki Tsukada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/230,241

(22) Filed: Aug. 4, 2023

(65) Prior Publication Data

US 2024/0056536 A1 Feb. 15, 2024

(30) Foreign Application Priority Data

Aug. 9, 2022 (JP) ................................. 2022-127044

(51) Int. Cl.
*G06F 15/00* (2006.01)
*H04N 1/00* (2006.01)

(52) U.S. Cl.
CPC ..... *H04N 1/00503* (2013.01); *H04N 1/00474* (2013.01)

(58) Field of Classification Search
None
See application file for complete search history.

(56) References Cited

U.S. PATENT DOCUMENTS

| | | |
|---|---|---|
| 2012/0206762 A1 | 8/2012 | Minagawa |
| 2013/0077119 A1* | 3/2013 | Arai ........................ G03G 15/00 358/1.13 |
| 2013/0321840 A1* | 12/2013 | Yamamoto ......... H04N 1/00482 358/1.13 |
| 2015/0070726 A1* | 3/2015 | Umezawa .......... H04N 1/00408 358/1.15 |
| 2016/0231686 A1* | 8/2016 | Itoh ....................... G03G 15/502 |
| 2021/0185187 A1* | 6/2021 | Shino ................. H04N 1/00482 |
| 2021/0306490 A1* | 9/2021 | Mizuno ................ H04N 1/4433 |
| 2022/0014639 A1* | 1/2022 | Omori ................ H04N 1/00427 |

FOREIGN PATENT DOCUMENTS

JP 2012-168894 A 9/2012

\* cited by examiner

*Primary Examiner* — Mark R Milia

(74) *Attorney, Agent, or Firm* — Venable LLP

(57) ABSTRACT

Provided is an information processing apparatus including a function selection screen on which a function option from which an arbitrary function can be selected is arranged, the information processing apparatus including a determination unit that determines a function to be executed based on arrangement of the function option related to a specific type function on the function selection screen in a case where an execution operation to execute any function of the information processing apparatus is received while no function option is selected on the function selection screen.

23 Claims, 19 Drawing Sheets

| FUNCTION | DEFAULT COPY | TWO-SIDE COPY | MEMORY CARD PRINTING | ... |
|---|---|---|---|---|
| NUMBER OF TIMES OF EXECUTION (INCREMENTED IN EVERY EXECUTION) | 10 | 4 | 0 | ... |

FIG.11

| FUNCTION | DEFAULT COPY | TWO-SIDE COPY | MEMORY CARD PRINTING |
|---|---|---|---|
| EXECUTION ORDER HISTORY (FUNCTION EXECUTED LAST IS 1, AND EXECUTION ORDER IS INDICATED BY FOLLOWING NUMBERS) | 1 | - | 2 |
| ⋮ | ⋮ | | ⋮ |

FIG.14

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present disclosure relates to an information processing apparatus, a method of controlling the information processing apparatus, and a storage medium.

Description of the Related Art

There has been known a technique to execute a function optimal for a user with a few operation steps. For example, Japanese Patent Laid-Open No. 2012-168894 describes a method of using a batch setting button to perform a printing operation with short steps in a printing apparatus having multiple functions. The use of the batch setting button makes it possible to execute printing without setting details every time.

There have been demanded various settings for printing with a few operation steps.

SUMMARY OF THE INVENTION

To this end, an object of the present disclosure is to execute a desired function with a few operation steps.

An information processing apparatus including a function selection screen on which a function option from which an arbitrary function can be selected is arranged, includes: a determination unit that determines a function to be executed based on arrangement of the function option related to a specific type function on the function selection screen in a case where an execution operation to execute any function of the information processing apparatus is received while no function option is selected on the function selection screen.

Further features of the present invention will become apparent from the following description of exemplary embodiments with reference to the attached drawings.

BRIEF DESCRIPTION OF THE DRAWINGS

FIG. 11 is a diagram illustrating held data of the number of times of execution of each function;

FIG. 14 is a diagram illustrating saved data of the execution order history of each function;

DESCRIPTION OF THE EMBODIMENTS

Figure 1:
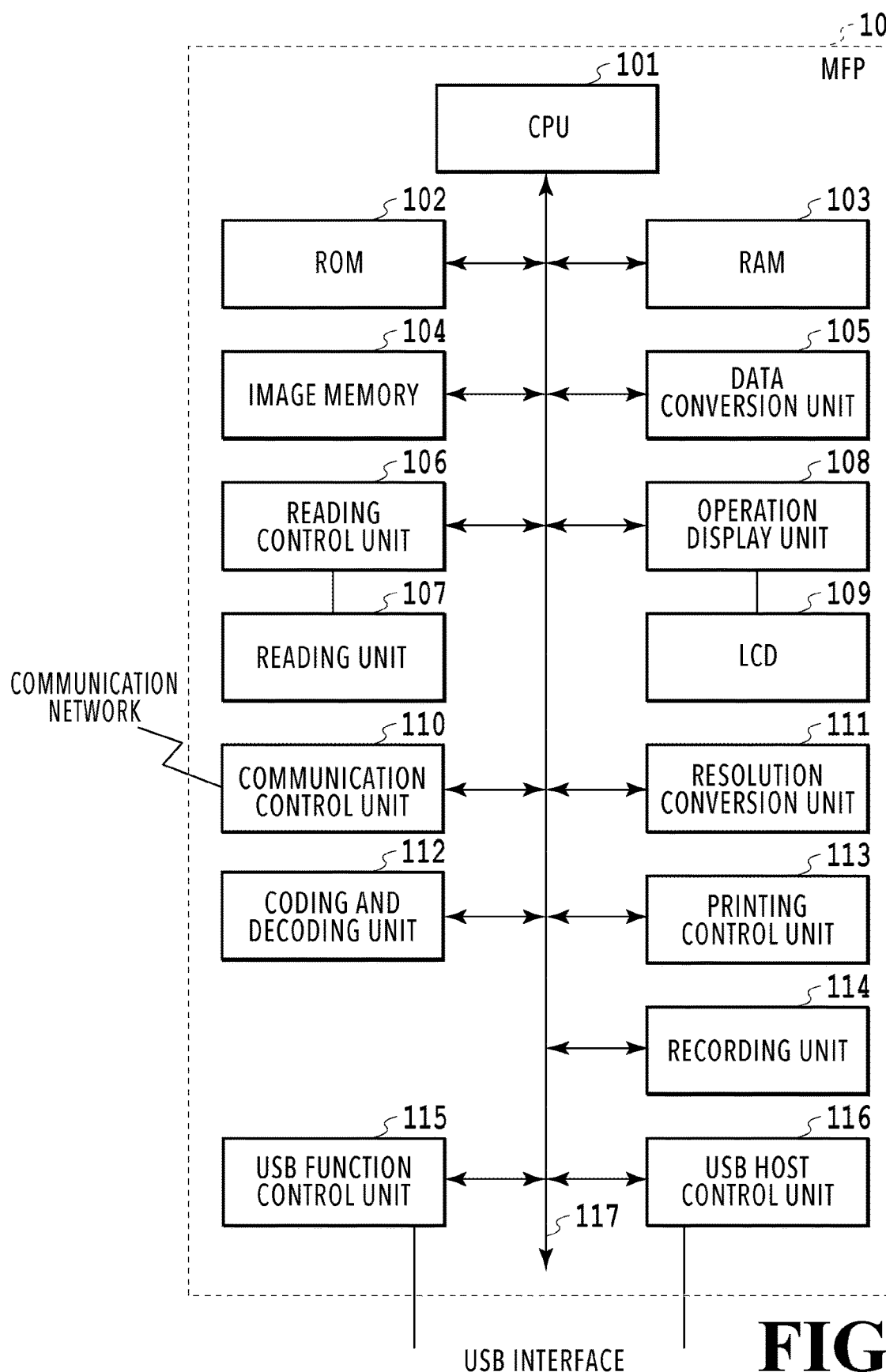
FIG. 1 is a block diagram of an MFP.

Embodiments of the present disclosure are described below with reference to the drawings. Note that, the embodiments below are not intended to limit the present disclosure, and not all the combinations of the characteristics described in the present embodiments are necessarily required for the means for solving the problems of the present disclosure. Note that, the same configurations are described with the same reference numerals denoted thereto.

Embodiment 1

FIG. 1 is a block diagram illustrating a schematic configuration example of a multi-function printer (MFP) 100 in the present embodiment. The MFP 100 is a kind of an information processing apparatus. Additionally, the MFP 100 is a kind of an electronic apparatus. Note that, although an information processing apparatus that has a printing function and an image reading function is described in the present embodiment an information processing apparatus that does not have those functions may be applicable.

The MFP 100 of the present embodiment has an information processing function such as instructing generating, storing, and transmitting device information including log information and status information. Additionally, the MFP 100 has an image formation function to form an image on a printing medium by using a printing control unit 113 and a recording unit 114 described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution conversion unit 111. In addition, the MFP 100 includes a coding and decoding unit 112, the printing control unit 113, the recording unit 114, a USB function control unit 115, a USB host control unit 116, and a bus 117.

The CPU 101 is a system control unit and controls overall the MFP 100. The ROM 102 is a non-volatile memory that stores fixed data such as a control program to be executed by the CPU 101, a data table, or an embedded operating system (OS). In the present embodiment, each control program operatable by the MFP 100 is stored in the ROM 102, and software execution control such as scheduling, task switching, or interruption processing is performed under the management by the embedded OS. The ROM 102 stores information indicating a permission state, which indicates whether to provide device information to the outside. The RAM 103 is formed of a static random access memory (SRAM) or the like that requires a backup power supply, and feeding to the RAM 103 is guaranteed by a not-illustrated primary battery for data backup. The RAM 103 stores a program control variable and the like. The image memory 104 is formed of a dynamic random access memory (DRAM) or the like and can store image data. Additionally, a part of the area in the image memory 104 is secured as a work area to execute software processing. The data conversion unit 105 can perform conversion of the image data such as page description language (PDL) analysis and computer graphics (CG) development of character data.

The reading unit 107 optically reads an original document by a CIS image sensor and converts it into an electric image signal. The reading control unit 106 performs various types of image processing such as binarization processing and half tone processing to this image signal and outputs high-definition image data. Note that, a method of optically reading the original document may be either of: a sheet reading control method in which the original document is read by a fixed CIS image sensor; and a book reading control method in which the original document fixed on a platen glass is read by a moving CIS image sensor.

The operation display unit 108 includes a minimal key such as a power supply key, a determination key, and a cancel key and a display unit such as a light-emitting diode (LED), the LCD 109, or the like. Additionally, the LCD 109 includes a touch panel and can not only display a state of the apparatus but also can receive an operation from a user by selecting a software key displayed on the LCD through the touch panel. If an operation by the user is not performed for a certain period of time, the LCD 109 switches off a backlight of the LCD 109 to reduce the power consumption.

The communication control unit 110 controls communication between the MFP 100 and a communication network 300 and establishes connection to an Internet service provider and communication of various data with a service management server 200. Additionally, the communication control unit 110 can determine whether the MFP 100 is connected to the Internet or is connected to only a LAN. The connection between the communication control unit 110 and the communication network 300 is established by a publicly known method such as HTTP and XMPP.

The resolution conversion unit 111 performs resolution conversion processing such as mutual conversion between image data in millimeters and image data in inches. Note that, the resolution conversion unit 111 also can execute enlarging and reducing processing on the image data.

The coding and decoding unit 112 performs coding and decoding processing or performs enlarging and reducing processing on the image data (uncompressed, MH, R, MMR, JBIG, JPEG, and so on) handled by the MFP 100.

The printing control unit 113 performs various types of image processing such as smoothing processing, printing density correction processing, and color correction on the image data to be printed to convert it into high-definition image data and then outputs it to the recording unit 114. The printing control unit 113 also plays a role to regularly obtain state information data of the recording unit 114. The recording unit 114 is formed of a laser beam printer, an ink-jet printer, or the like and prints the image data generated by the printing control unit 113 on the printing medium such as a paper sheet.

The USB function control unit 115 performs protocol control according to the USB communication standard.

The USB host control unit 116 is a control unit to establish communication based on the protocol determined by the USB communication standard. This USB communication standard is a standard for bidirectional high-speed data communication. This USB communication standard determines that multiple hubs or functions (slaves) are connectable to a single host(master). That is, the USB host control unit 116 provides a function as a host in the USB communication. The constituents other than the reading unit 107 and the LCD 109 are connected to each other through the bus 117.

Figure 2:
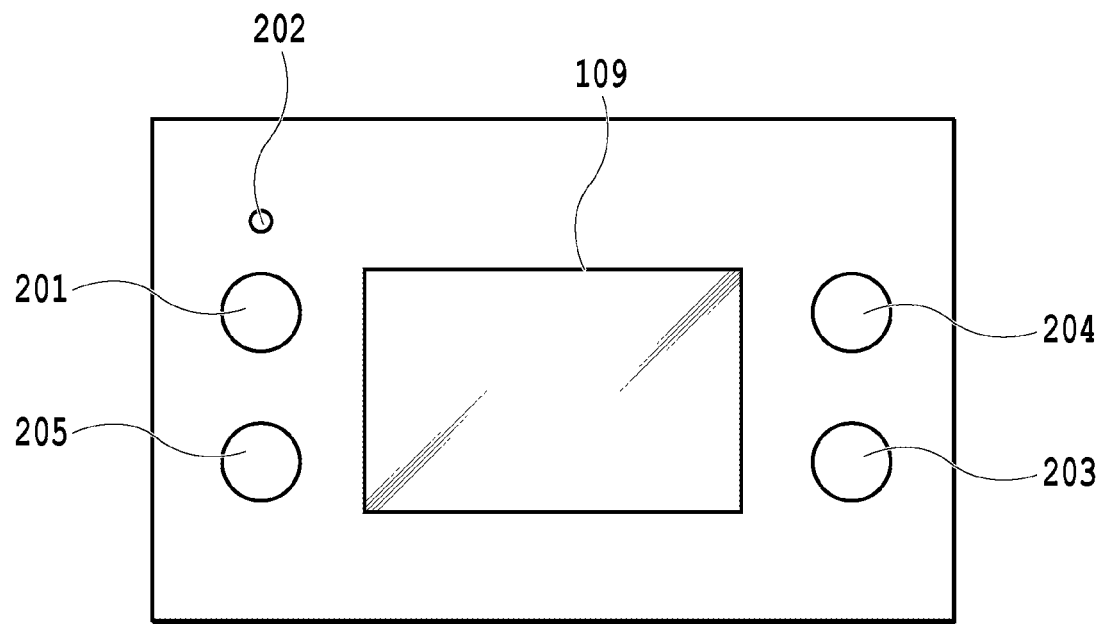
FIG. 2 is a diagram illustrating an operation display unit of the MFP.

FIG. 2 is a perspective view illustrating a configuration example of the operation display unit 108 in the present embodiment. The operation display unit 108 includes a power supply key 201, an LED 202, a cancel button 203, an execution start button 204, and a home button 205. The power supply key 201 is a key that turns on and off a power supply of the apparatus. The LED 202 is an LED that expresses a state of the apparatus by lighting or blinking. For example, in a state of power-on, the LED 202 is lighted in green color, and in execution such as printing, the LED 202 blinks in green color. The cancel button 203 is a key that cancels an operation being executed. The execution start button 204 is for starting function execution by the apparatus. Note that, operating the execution start button 204 to execute a function is referred to as an execution operation. The home button 205 is a key that executes transition to a home screen by being pressed. The home screen is a screen displayed first in a case where an operation panel of the operation display unit 108 is displayed as a screen. Additionally, in the present embodiment, the MFP 100 includes two types of home screens, which are a default home screen and a custom home screen. The default home screen is a home screen in which some functions are arranged by default.

The custom home screen is a home screen in which the user is able to arrange any function, and in the present embodiment, multiple custom home screens can be switched by using tabs. Additionally, the default home screen and the custom home screen are also referred to as a function selection screen since various functions are arranged therein and those functions are executed by being selected by the user. Details of the home screens are each described below.

Figure 3:
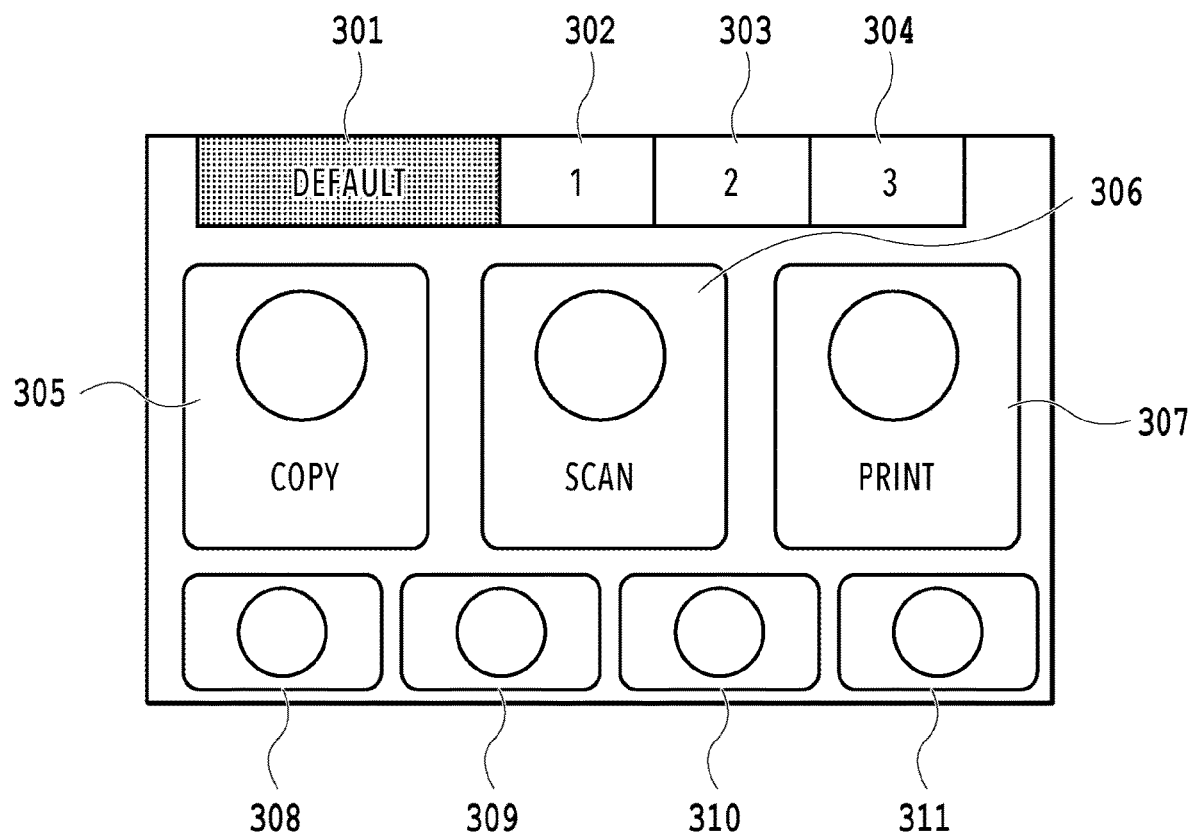
FIG. 3 is a diagram illustrating a default home screen displayed on an operation panel.

FIG. 3 is a diagram illustrating the default home screen displayed on the operation panel (the LCD 109). A tab 301 is a tab corresponding to the default home screen. Tabs 302 (a tab 1), 303 (a tab 2), and 304 (a tab 3) are tabs each corresponding to the custom home screen.

The user can switch the home screens by pressing the tabs. The tab color of the tab 301 different from the color of the other tabs indicates that the screen currently displayed on the operation panel (the LCD 109) is the default home screen. A copy menu button 305, a scan menu button 306, a print menu button 307, a LAN button 308, a wireless connection button 309, a setting button 310, and a hint button 311 are buttons respectively corresponding to menus. Transition to each menu corresponding to each button is made with the user pressing the corresponding button.

Figure 4A:
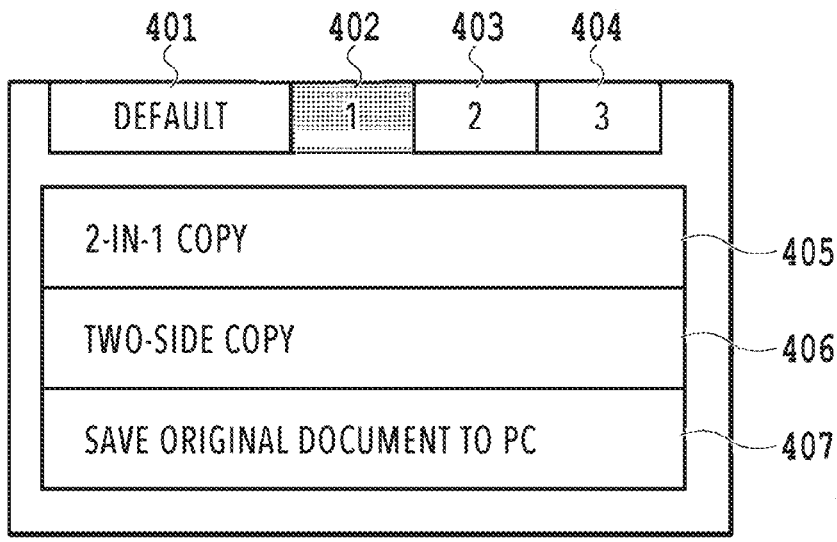
FIGS. 4A to 4C are diagrams illustrating a custom home screen displayed on the operation panel.
Figure 4B:
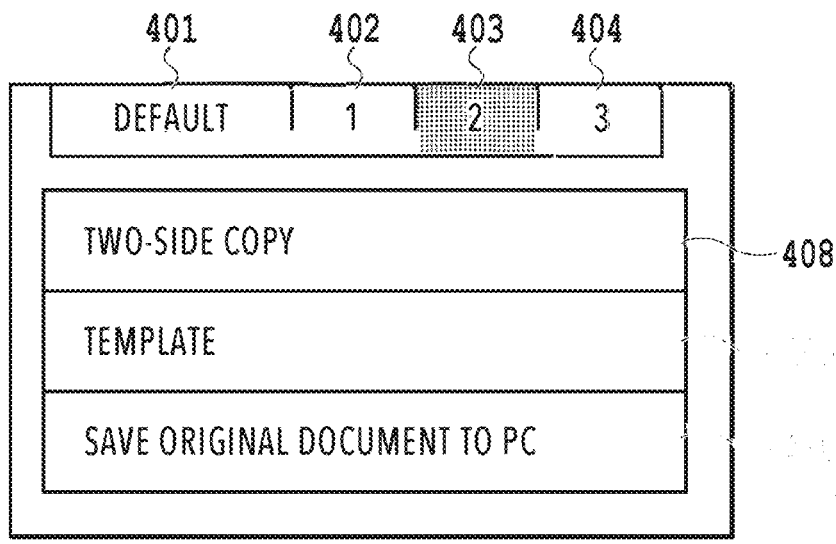
Figure 4C:
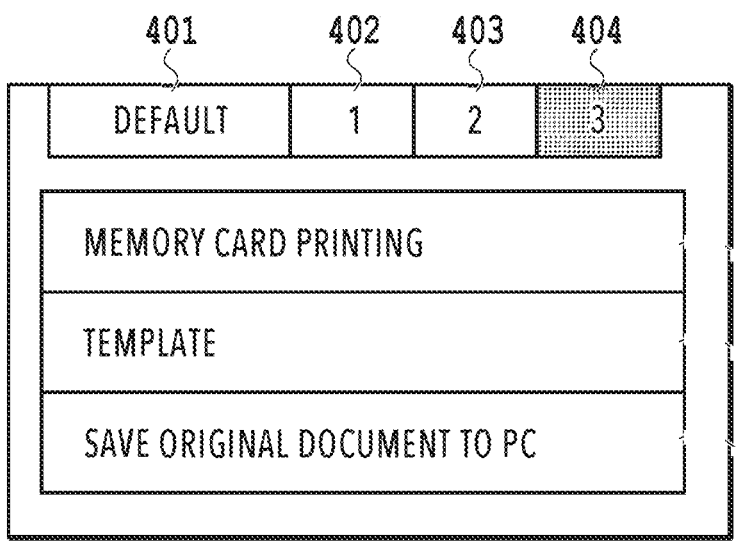

FIGS. 4A to 4C are diagrams illustrating the custom home screen displayed on the operation panel. FIGS. 4A, 4B, and 4C illustrate the custom home screens of a tab 402 (the tab 1), a tab 403 (the tab 2), and a tab 404 (the tab 3), respectively. For example, FIG. 4A illustrates that the color of the tab 1 different from the color of the other tabs indicates that the screen currently displayed on the operation panel (the LCD 109) is the custom home screen of the tab 1. In the present embodiment, the custom home screen includes function options, which are arbitrary functions arranged in a vertical direction by the user. That is, on the custom home screen, the user can arbitrarily designate a function to be arranged as the function options. Additionally, the function selection screen displayed on the operation panel is also held while the MFP 100 is turned off, and in the activation of the MFP 100, the function selection screen displayed last time is displayed as the home screen. Note that, if the user presses a tab 401 (a default tab) illustrated in FIG. 4, the default home screen illustrated in FIG. 3 is displayed.

In the function options of the tab 1, functions of 2-in-1 copy 405, two-side copy 406, and save original document to PC 407 are arranged. Note that, a "function" in the present embodiment indicates each function arranged in the function options of the home screen. In addition, in the present embodiment, the function related to the copying function is referred to as a "specific type function". That is, for example, in FIG. 4A, 2-in-1 copy 405 and two-side copy 406 are the specific type functions arranged in the function options.

Figure 5:
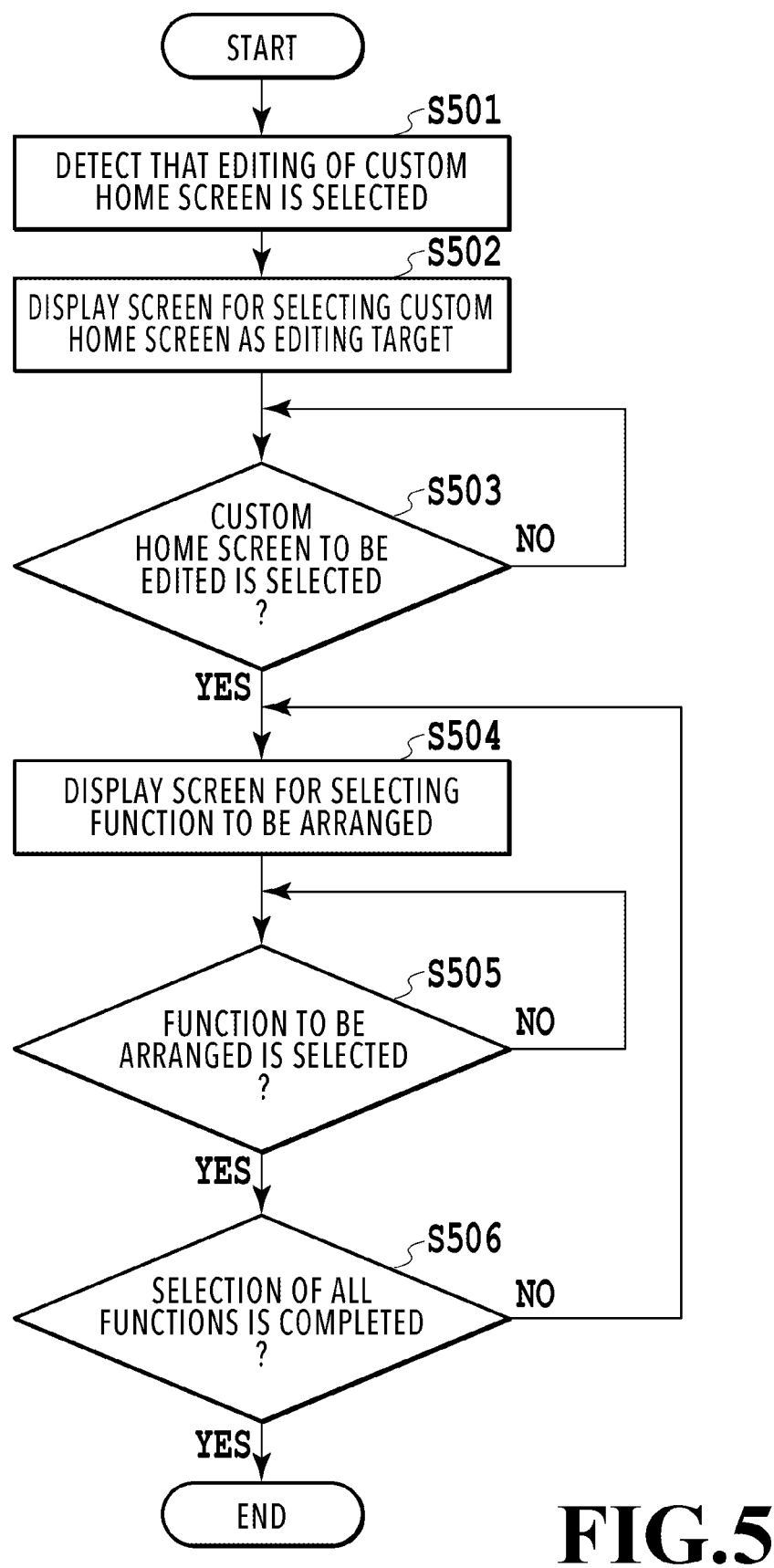
FIG. 5 is a flowchart of registering a function on a function selection screen.

FIG. 5 is a flowchart in a case of registering the function on the function selection screen. The present processing is processing executed by the CPU 101 of the MFP 100. That is, the processing is implemented with the CPU 101 deploying and executing a program stored in the ROM 102 into the RAM 103. Note that, "S" in the following descriptions means a step in a flowchart, and the same applies to the following embodiments. Additionally, the processing of the present flowchart is started once the setting button 310 arranged on the default home screen illustrated in FIG. 3 is pressed, for example.

In S501, based on the pressing of the setting button 310 on the default home screen in FIG. 3, the CPU 101 detects an instruction to edit the custom home screen. In S502, the CPU 101 displays a screen for selecting the custom home screen as an editing target. That is, a screen for selecting any one of the tabs of the custom home screens is displayed on the screen illustrated in FIG. 6. Next, in S503, the CPU 101 determines whether the custom home screen as the editing target is selected. If it is determined as YES in the determination in the present step (it is determined that the custom home screen is selected), the CPU 101 allows the process to proceed to S504, and if it is determined as NO, the CPU 101 repeats the present processing until detecting that the custom home screen is selected.

Figure 7:
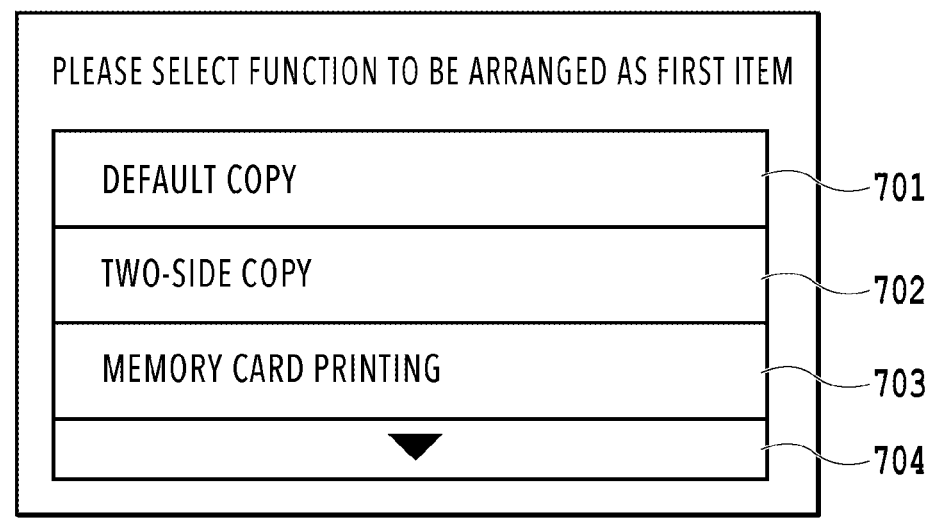
FIG. 7 is a diagram illustrating a screen in the case of registering the function on the function selection screen.

In S504, the CPU 101 displays a screen for selecting the function to be arranged on the custom home screen selected in S503. That is, the screen illustrated in FIG. 7 is displayed. In S505, the CPU 101 determines whether the function to be arranged on the custom home screen is selected. If it is determined as YES in the determination in the present step, the CPU 101 allows the process to proceed to S506, and if it is determined as NO, the CPU 101 repeats the present processing until detecting that the function is selected. In S506, the CPU 101 determines whether the selection of the function to be arranged on the custom home screen is completed. Specifically, it is determined that the selection of the function is completed based on the pressing of a complete button (not illustrated), which is displayed on the screen illustrated in FIG. 7 and pressed by the user once the setting of the function selection is completed. If it is determined as NO in the determination of the present step, the CPU 101 allows the process to return to S504, and if it is determined as YES, the CPU 101 ends the processing of the present flowchart.

Figure 6:
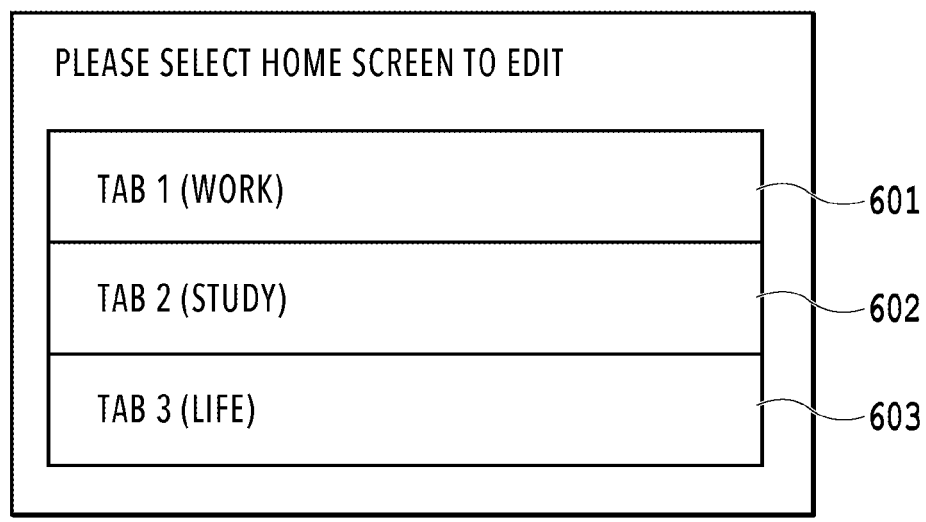
FIG. 6 is a diagram illustrating a screen in the case of registering the function on the function selection screen.

FIG. 6 is the screen displayed in S502 in FIG. 5 for selecting the custom home screen as the editing target. The user selects the custom home screen (any one of the tabs) to be the editing target from the custom home screens displayed on the screen in FIG. 6. In FIG. 6, as an example, a tab 1 (work) 601, a tab 2 (study) 602, and a tab 3 (life) 603 are displayed. The user is able to select the editing target by touching and operating the tab that the user wants to edit.

FIG. 7 is the screen for selecting the function to be arranged on the tab (the custom home screen) selected in FIG. 6. As an example, FIG. 7 illustrates a screen for selecting the function to be arranged as a first item. In the present embodiment, as an example of the selectable function, default copy 701, two-side copy 702, and memory card printing 703 are applied. Additionally, the displayed screen illustrated in FIG. 7 includes a scroll button 704 to scroll a list. That is, the displayed screen illustrated in FIG. 7 also includes a function other than the above-described three functions, and the user can select the function by scrolling the list.

Figure 8:
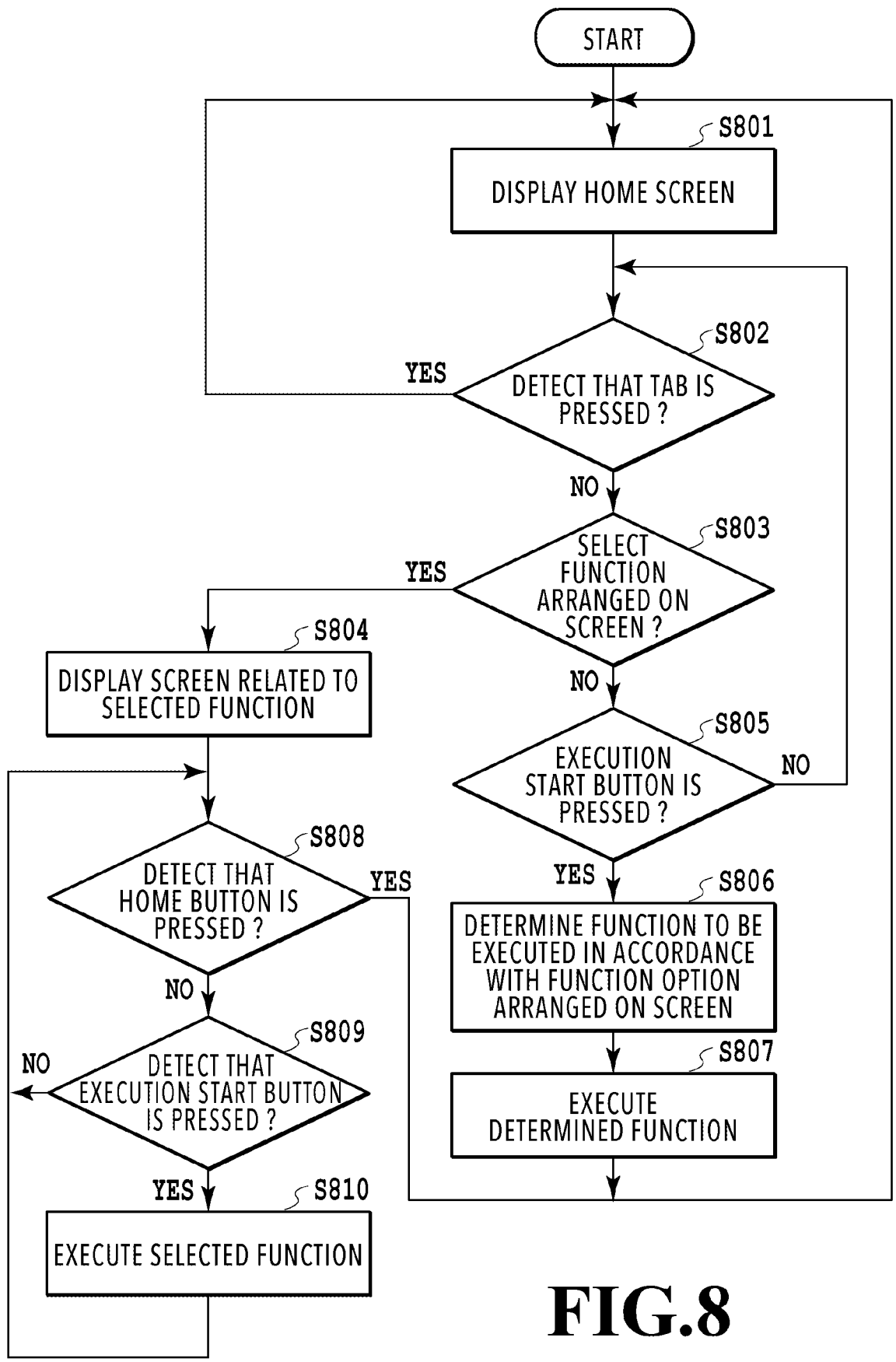
FIG. 8 is a flowchart illustrating an operation in a case of pressing an execution start button in a home screen.

FIG. 8 is a flowchart describing a function execution sequence in the present embodiment. The processing in FIG. 8 is processing to execute the specific type function (that is, the copying function) in a case where the execution start button 204 is pressed after selecting the function arranged on the home screen and in a case where the execution start button 204 is pressed without selecting the function. The present processing is processing executed by the CPU 101 of the MFP 100. That is, the processing is implemented with the CPU 101 deploying and executing the program stored in the ROM 102 into the RAM 103. Additionally, the present processing is started once the MFP 100 is turned on, or once the user touches the touch panel.

First, once the apparatus is powered on, in S801, the CPU 101 displays the home screen on the LCD 109. In the present embodiment, an example in which the default home screen is displayed at power-on is described. However, it is possible to display the custom home screen without displaying the default home screen by pressing the tabs 302 to 304 illustrated in FIG. 3, and it is also possible to display the home screen (either the default home or the custom home) from the last time the power is turned off.

In S802, the CPU 101 detects whether either one of the tabs 401 to 404 displayed on the home screen illustrated in FIG. 4 are pressed through the touch panel. If it is detected that the tab is pressed, the CPU 101 allows the process to return to S801 and displays the default home screen or the custom home screen corresponding to the selected tab on the LCD 109. For example, if it is detected that the tab 302 is pressed on the default home screen, the CPU 101 displays the custom home screen of the tab 1 illustrated in FIG. 4.

On the other hand, in S802, if it is not detected that the tab is pressed, in S803, the CPU 101 determines whether the function arranged on the home screen is selected. If it is determined as YES (selected), the CPU 101 allows the process to proceed to S804. On the other hand, if it is determined as NO (not selected), the process proceeds to S805.

In S804, the CPU 101 performs screen display corresponding to the function selected in S803. For example, if it is detected that default copying is selected in S803, the CPU 101 performs screen display related to default copying in the present step. On the other hand, for example, if it is detected that the custom menu button of 2-in-1 copy 405 is pressed, the CPU 101 performs screen display for setting details of 2-in-1 copying in the present step. After S804, the CPU 101 allows the process to proceed to processing in S808.

In S808, the CPU 101 determines whether it is detected that the home button 205 is pressed on the screen corresponding to each function displayed in S804. If it is determined as YES (it is detected that the home button 205 is pressed), the CPU 101 allows the process to return to S801 and performs screen transition to the home screen. On the other hand, if it is determined as NO, the process proceeds to S809.

In S809, the CPU 101 determines whether it is detected that the execution start button 204 is pressed on the screen display corresponding to the selected function. If it is determined as YES (it is detected that the execution start button 204 is pressed), the CPU 101 allows the process to proceed to S810 and executes the selected function.

On the other hand, if it is determined as NO (it is not detected that the execution start button 204 is pressed), the CPU 101 allows the process to return to S808. That is, in S808 to S809, the CPU 101 performs processing to detect either button of the execution start button 204 for executing the function selected in S804 and the home button 205 for canceling the execution of the selected function. In S810, the CPU 101 executes the processing corresponding to the selected function.

After the processing is executed, the process returns to the processing to wait for detecting the home button 205 or the execution start button 204 during the screen display corresponding to the selected function.

Next, processing in a case where the function arranged on the screen is not selected is described. In S805, the CPU 101 determines whether it is detected that the execution start button 204 is pressed. If it is determined as YES (it is detected that the execution start button 204 is pressed), the CPU 101 allows the process to proceed to S806. On the other hand, if it is determined as NO, the CPU 101 allows the process to return to S802.

In S806, the CPU 101 determines the function to be executed in accordance with the details of the arrangement of the specific type functions arranged in the function options on the current home screen. In the present embodiment, the details of the arrangement indicate the number of the specific type functions, for example. Additionally, the details of the arrangement indicate which position of the function options the specific type functions are arranged in. The processing in S806 is processing in a case where the execution start button 204 is pressed without pressing the tab or selecting the function on the home screen. An improvement in the operability is expected with the pervious setting of a method of processing for a case where the execution start button 204 is pressed without selecting the function from the home screen as described above. The method of the processing set previously is described later. In S807, the CPU 101 executes the function determined in S806 and allows the process to return to S801.

Figure 9:
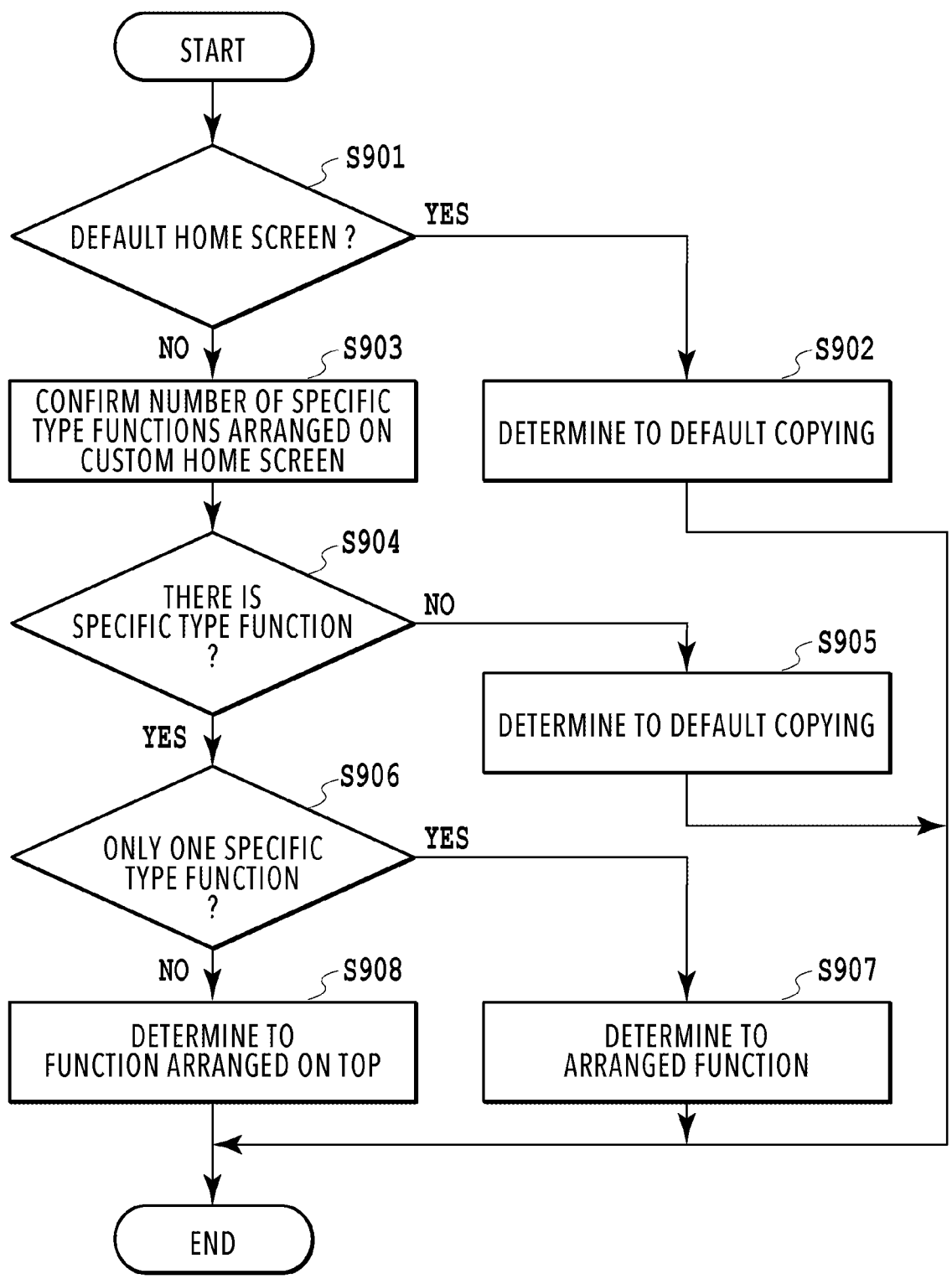
FIG. 9 is a flowchart illustrating a method of determining a function to be executed in a case where the execution start button is pressed.

FIG. 9 is a flowchart illustrating the method of determining the function to be executed in S806 in FIG. 8 in the present embodiment. In the present embodiment, the function to be executed is determined based on the number of the specific type functions arranged on the home screen. The present processing is started once it is detected in S805 that the execution start button 204 is pressed.

In S901, the CPU 101 determines whether the displayed screen is the default home screen. If it is determined as YES, the CPU 101 allows the process to proceed to S902. If it is determined as NO, the process proceeds to S903. In S902, the CPU 101 determines the function to be executed to the default copying function and ends the processing of the present flowchart. The default copying function is a function arranged on the default home screen and is a function to execute default setting of the copying function; accordingly, it is assumed that the frequency that the user uses the default copying function is high. Additionally, since the function that corresponds to the specific type function on the default home screen is the default copying function, the function to be executed is determined to the default copying in the present step. However, a mode to execute another function may be applicable.

In S903, theCPU 101 confirms the number of the specific type functions arranged on the custom home screen. In S904, the CPU 101 determines whether the specific type function is arranged on the displayed custom home screen. If it is determined as YES (the specific type function is arranged), the CPU 101 allows the process to proceed to S906, and if it is determined as NO (no specific type function is arranged), the CPU 101 allows the process to proceed to S905. In S905, the CPU 101 determines the function to be executed to the default copying function and ends the processing of the present flowchart. In the present embodiment, in a case where the user selects no function, and no function related to copying is arranged on the custom home screen, default copying that can be assumed to have a high use frequency in general is determined to the function to be executed. However, a mode to execute another function may be applicable. Note that, in this case, even if the default copying function is not arranged in the function options on the custom home screen, it is possible to determine the function to be executed to the default copying function.

Now, the determination processing in S904 is described with reference to FIG. 4. For example, in a case where the custom home screen of the tab 1 illustrated in FIG. 4A is displayed, there are two functions corresponding to the specific type function, 2-in-1 copy 405 and two-side copy 406. Accordingly, it is determined as YES in the step of S904. On the other hand, in a case where the custom home screen of the tab 3 illustrated in FIG. 4C is displayed, there is no function corresponding to the specific type function. Accordingly, it is determined as NO in S904, and in S905, the default copying function is determined to the function to be executed.

In S906, the CPU 101 determines whether the number of the specific type functions arranged on the custom home screen is only one. In S906, if it is determined as YES (only one), the CPU 101 allows the process to proceed to S907, and if it is determined as NO (multiple), the CPU 101 allows the process to proceed to S908.

In S907, the CPU 101 determines the function arranged in the function options as the specific type function to the function to be executed. Thereafter, the CPU 101 ends the processing of the present flowchart.

In S908, the CPU 101 determines the specific type function arranged on the top of the displayed custom home screen to the function to be executed. Thereafter, the CPU 101 ends the processing of the present flowchart.

Now, the determination processing in S906 is described with reference to FIG. 4. For example, in a case where the custom home screen of the tab 2 illustrated in FIG. 4B is displayed, there is only one function that corresponds to the specific type function, two-side copying 408. In this case, it is determined as YES in S906, and the process proceeds to S907. On the other hand, in a case where the custom home screen of the tab 1 illustrated in FIG. 4A is displayed, there are two functions that correspond to the specific type function, 2-in-1 copy 405 and two-side copy 406. In this case, it is determined as NO in S906, and the process proceeds to S908.

This is the flow of the processing in the present embodiment.

Note that, as it is described above, in a case where the default home screen is displayed, or in a case where no specific type function is arranged on the custom home screen, the "default copying" function is determined to the function to be executed as a predetermined function. However, the predetermined function is not limited to "default copying".

Additionally, in a case where multiple executable custom menu buttons are arranged on the displayed custom home screen, the function arranged on the top of the displayed custom home screen is determined to be executed. However, it is not limited to the top, and the function arranged in another predetermined position may be executed. For example, in a case where the functions are arrayed in a transverse direction, not in the vertical direction as illustrated in FIG. 4, the function arranged in the leftmost position may be executed. Additionally, the functions may be arranged in another positional relationship. A method of determining the function that is different from that in the present embodiment is described in the later-described embodiment.

Additionally, although it is detected whether the home button 205 is pressed in S808 in FIG. 8, it is not limited thereto. For example, it may be detected whether the cancel button is pressed, or processing to return to the home screen if no operation is detected for a certain period of time may be performed.

As described above, according to the present embodiment, it is possible to execute a desired function with a few operation steps. Specifically, in a case where the execution start button 204 is pressed on the home screen including one or more specific type functions in the function options, it is possible to automatically execute an optimal function in accordance with the state of the functions arranged on the screen. Additionally, in a case where there is no specific type function in the function options, it is possible to execute a predetermined function determined in advance. This makes it possible to execute the function having a high possibility to be optimal for the user at that point with short steps without performing the printing setting operation every time.

Embodiment 2

In the present embodiment, the function to be executed is determined by a method different from Embodiment 1 in S908 in FIG. 9. Specifically, the number of times of execution of each function executed thus far is counted, and the function to be executed is determined based on each number of times of execution. The hard configuration or the configuration of the home screen of the present embodiment is the same as that in Embodiment 1; however, the method of determining the function to be executed in a case where there are arranged multiple executable functions on the home screen is different from that in Embodiment 1.

Figure 10:
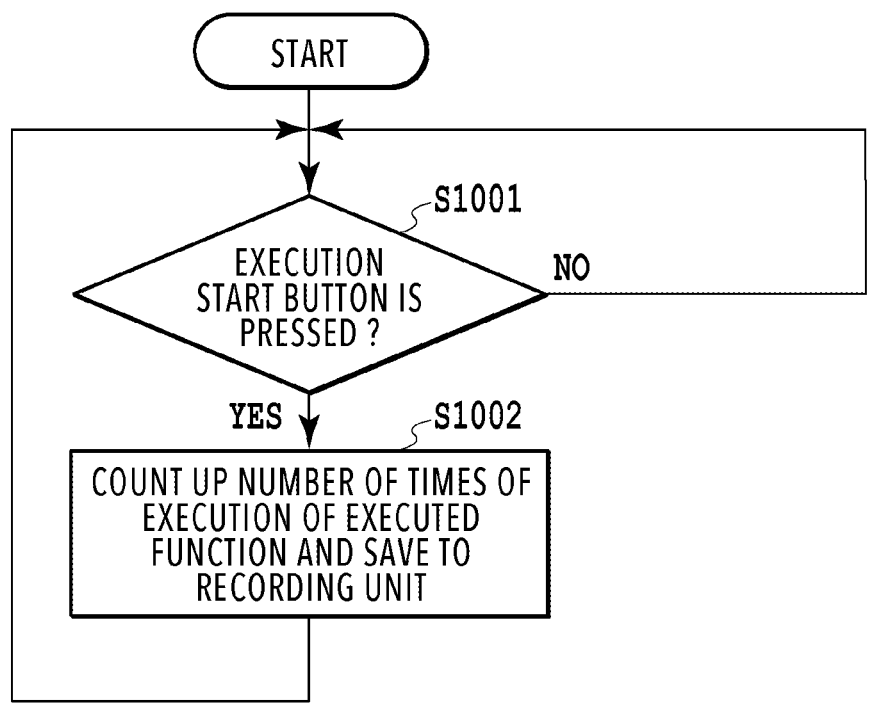
FIG. 10 is a flowchart of controlling counting of the number of times of execution.

FIG. 10 is a flowchart illustrating control to count up the number of times that the execution start button 204 is pressed. In S1001, the CPU 101 determines whether the execution start button 204 is pressed while an arbitrary function is selected. In S1001, if it is determined that the execution start button 204 is pressed, the CPU 101 allows the process to proceed to S1002, and in S1002, the CPU 101 counts up the number of times of execution of the selected arbitrary function and saves the value of the number of times of execution thus far to a non-volatile area of the recording unit 114. In S1001, if it is determined that the execution start button 204 is not pressed, the CPU 101 repeats the present processing.

FIG. 11 is a diagram illustrating the contents of data that the CPU 101 saves to the recording unit 114. As illustrated in FIG. 11, values of the number of times of execution thus far of all the functions of the apparatus are held individually. In the example in FIG. 11, a case where default copying is executed ten times, two-side copying is executed four times, and memory card printing is executed zero times is illustrated.

Figure 12:
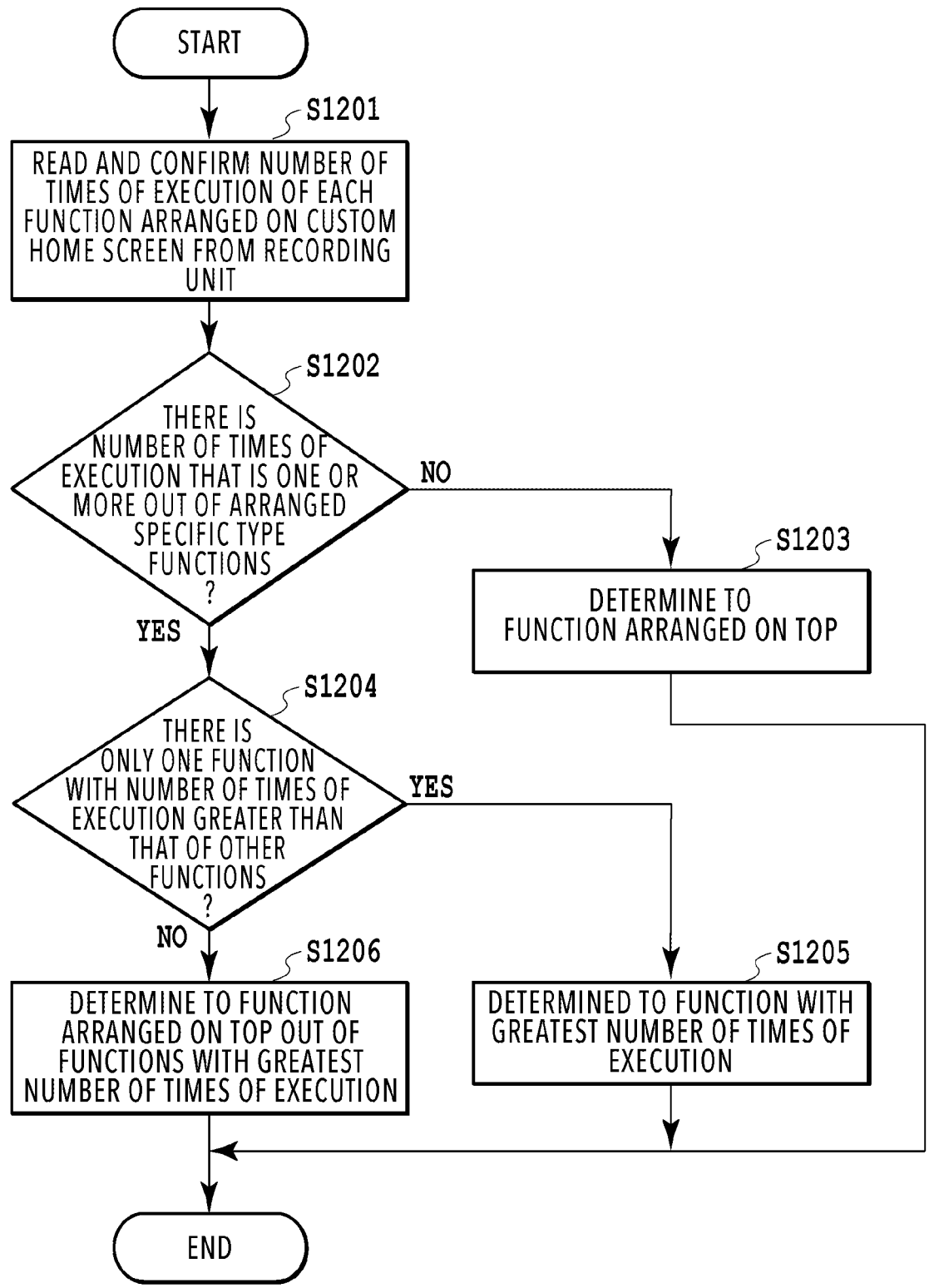
FIG. 12 is a flowchart illustrating a method of determining the function to be executed in a case where the execution start button is pressed.

FIG. 12 is a flowchart illustrating the processing performed in S908 in FIG. 9 in the present embodiment. In the present embodiment, the CPU 101 starts the processing to determine the function to be executed based on the value illustrated in FIG. 11 in a case where the execution start button 204 is pressed while the multiple functions are arranged on the home screen.

In S1201, the CPU 101 reads the number of times of execution of each function saved in the recording unit 114. In S1202, the CPU 101 determines whether there is a function with the number of times of execution that is one or more out of the specific type functions arranged on the custom home screen. In S1202, if it is determined as NO (the value of the number of times of execution of all the specific type functions arranged on the home screen is zero), the CPU 101 allows the process to proceed to S1203. On the other hand, in S1202, if it is determined as YES (there is the function with the value of the number of times of execution that is one or more out of the functions arranged on the home screen), the CPU 101 allows the process to proceed to S1204.

In S1203, the CPU 101 determines the function arranged on the top of the home screen out of the specific type functions to the function to be executed.

In S1204, the CPU 101 determines whether there is only one function that is with the number of times of execution greater than that of other functions out of the specific type functions arranged on the home screen. In S1204, if it is determined as YES, the CPU 101 allows the process to proceed to S1205, and if it is determined as NO (there are multiple functions with the greatest number of times of execution), the process proceeds to S1206.

In S1205, the CPU 101 determines the specific type function with the greatest number of times of execution to the function to be executed and ends the processing of the present flowchart.

In S1206, the CPU 101 determines the function arranged on the top of the custom home screen out of the specific type functions with the greatest number of times of execution to the function to be executed and ends the processing of the present flowchart.

This is the processing to determine the function to be executed of the present embodiment. Note that, although an example of executing the function arranged on the top of the custom home screen in a case where there is no function executed thus far is described in the present embodiment, it is not limited to executing the function arranged on the top, and another determination method may be applicable.

Note that, the function with the greatest number of times of execution can be said to have a high possibility to be executed by the user next more than a function with a less number of times of execution. In the present embodiment, the function that is executed the most by the user is automatically selected without performing a selecting operation; therefore, it is possible to execute the function with a high possibility that the user wants to execute with short steps.

Embodiment 3

In Embodiment 3, the CPU 101 determines the function to be executed in S908 in FIG. 9 based on an execution history. The hard configuration or the configuration of the home screen of the present embodiment is the same as that of Embodiments 1 and 2.

Figure 13:
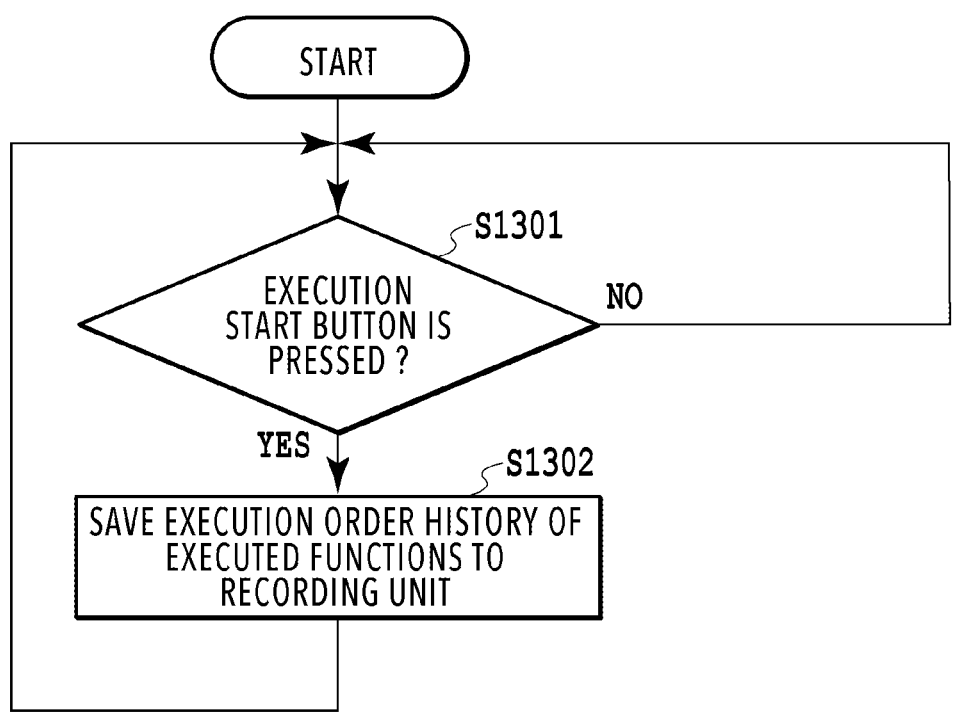
FIG. 13 is a flow of saving an execution order history in a case where the execution start button is pressed.

FIG. 13 is a flowchart illustrating control by the CPU 101 to record an execution order history in a case where the execution start button 204 is pressed in the present embodiment. In S1301, the CPU 101 determines whether it is detected that the execution start button 204 is pressed. In S1301, if it is determined as YES, the CPU 101 allows the process to proceed to S1302, and if it is determined as NO, the CPU 101 repeats the present processing.

In S1302, the CPU 101 updates the history information indicating the execution order of the functions executed thus far in the non-volatile area of the recording unit 114. Thereafter, every time the execution start button 204 is pressed, the present processing is repeated.

FIG. 14 is a diagram illustrating data contents saved in the recording unit 114. As illustrated in FIG. 14, a function executed last is provided with 1 (in FIG. 14, default copying). Likewise, a function executed immediately before the last is provided with 2. Thus, the data indicating the execution order is created and held in the recording unit 114.

Figure 15:
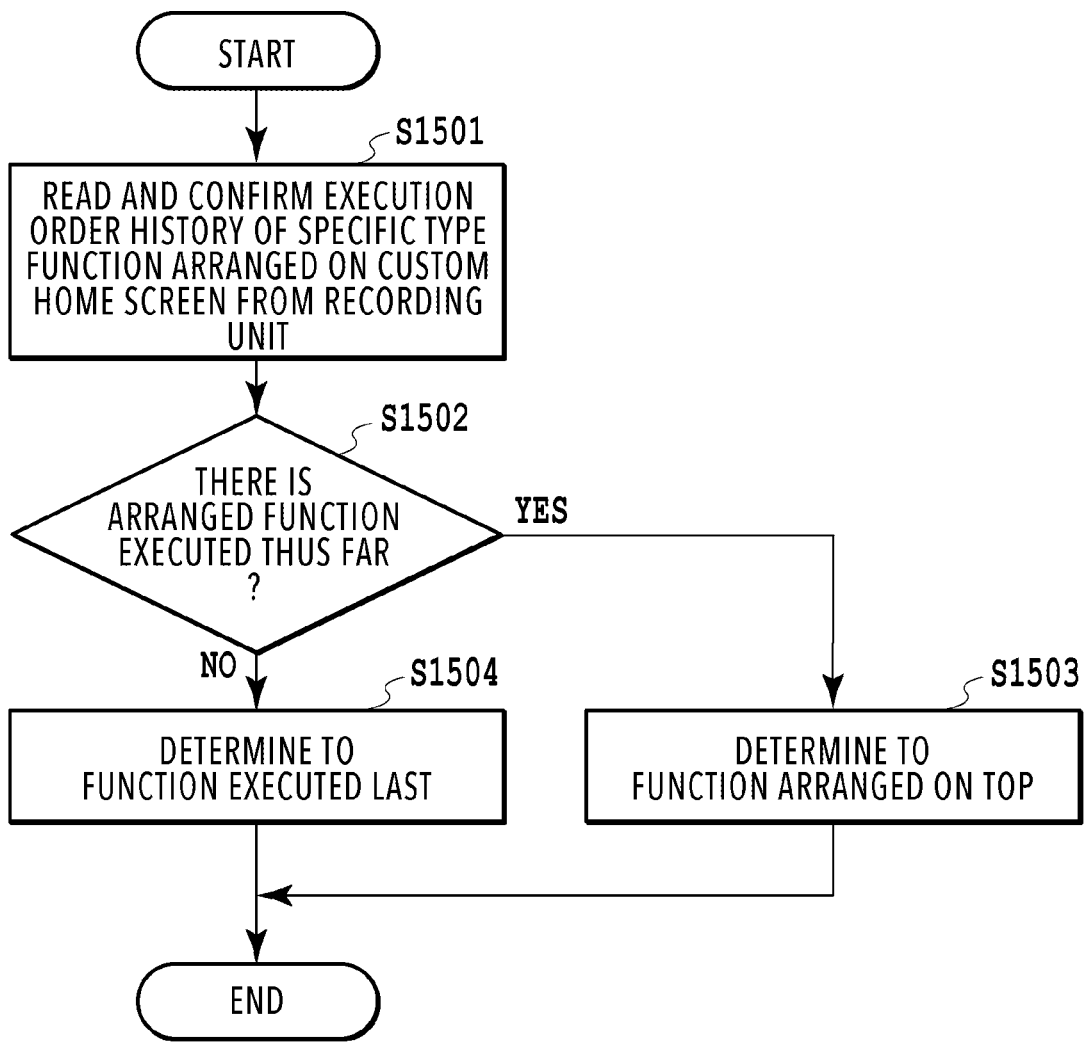
FIG. 15 is a flowchart illustrating a method of determining the function to be executed in a case where the execution start button is pressed.

FIG. 15 is a flowchart illustrating the processing performed in S908 in FIG. 9 of the present embodiment. The processing of the present flowchart is started once the execution start button 204 is pressed in S805 in FIG. 8.

In S1501, the CPU 101 reads execution order history information saved in the recording unit 114. In S1502, based on the execution order history information saved in the recording unit 114, the CPU 101 determines whether there is a function having the execution history out of the specific type functions currently arranged on the custom home screen. In S1501, if it is determined as YES, the CPU 101 allows the process to proceed to S1503, and if it is determined as NO (there is no function having the execution history out of the arranged specific type functions), the CPU 101 allows the process to proceed to S1504.

In S1503, based on the execution order history information, the CPU 101 determines the function executed last to the function to be executed and ends the processing of the present flowchart. In S1503, the CPU 101 determines the function arranged on the top of the home screen out of the specific type functions and ends the processing of the present flowchart.

This is the processing to determine the function to be executed of the present embodiment. Note that, although an example of selecting the function arranged on the top in S1504 in a case where there is no specific type function executed thus far is described, it is not limited thereto, and another determination method may be applicable.

The function executed last can be said to have a higher possibility to be executed next than a function executed earlier. Especially for the printing function, it is assumed that printing is often performed in a similar way multiple times in accordance with a paper sheet that is set once. Therefore, in the present embodiment, it is possible to execute again the function executed last time, which has a high possibility to be executed by the user, with short steps without performing the selecting operation every time.

Embodiment 4

In Embodiment 4, the function to be executed is determined based on the selection by the user from the functions arranged on the home screen in S908 in FIG. 9. The hard configuration and the configuration of the home screen of the present embodiment are the same as that of Embodiments 1, 2, and 3.

Figure 16:
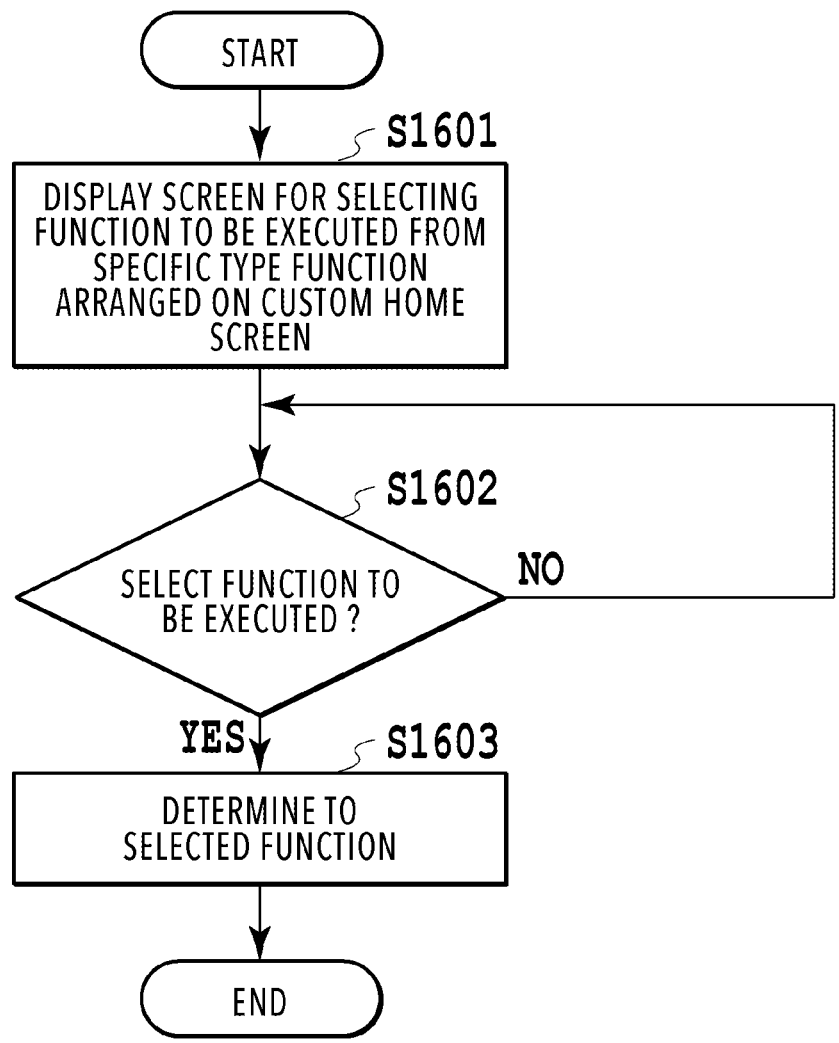
FIG. 16 is a flowchart illustrating control on a user to select the function to be executed.

FIG. 16 is a flowchart illustrating the processing performed in S908 in FIG. 9 in the present embodiment. First, in S1601, the CPU 101 displays a screen for selecting the specific type function arranged on the custom home screen. In S1602, the CPU 101 determines whether the function to be executed is selected by the user. In S1602, if it is determined as YES, the CPU 101 allows the process to proceed to S1603, and if it is determined as NO, the CPU 101 repeats the present processing until it is detected that the user selects the function. In S1603, the CPU 101 determines the function selected by the user in S1602 to the function to be executed and ends the processing of the present flowchart.

Figure 17:
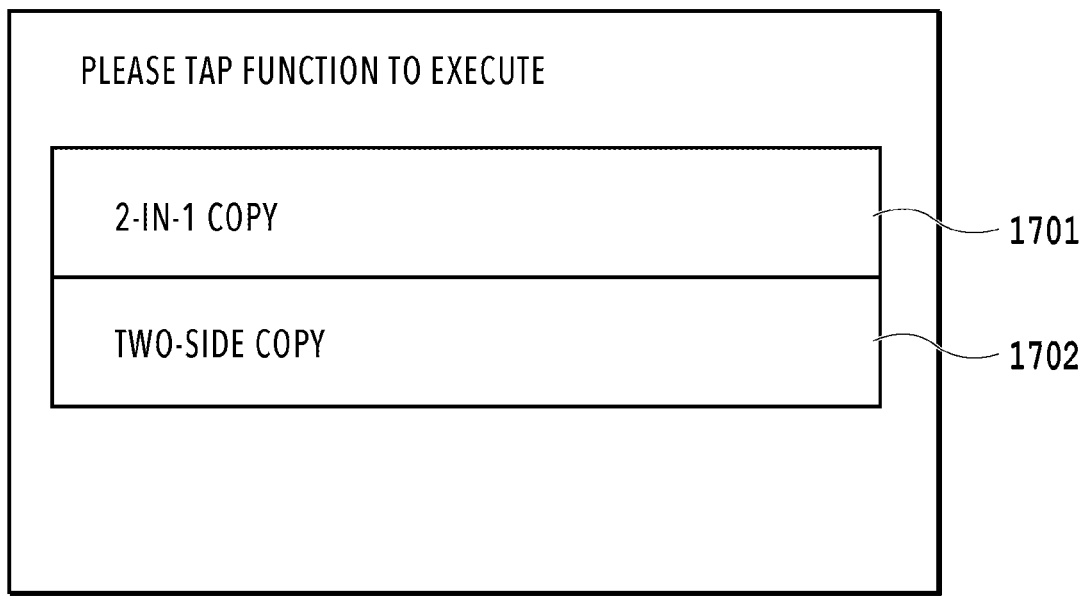
FIG. 17 is a diagram illustrating a screen for selecting the function to be executed.

FIG. 17 is a diagram illustrating the displayed screen for the user to select the specific type function in S1601. As described above, the specific type function is the function related to the copying function. Accordingly, in FIG. 17, as an example, 2-in-1 copy 1701 and two-side copy 1702 are displayed. However, the displayed function is not limited thereto, and the selecting method is not limited to the selecting using a list screen as illustrated in FIG. 17.

As described above, in the present embodiment, in a case where the execution start button 204 is pressed on the home screen, the function to be executed is selected by the user from the specific type functions arranged on the screen. This makes it possible to select the function to be executed easier with shorter steps than a case where the user selects the function to be executed from all the corresponding functions. Additionally, it is possible to select a function that the user desires more reliably than Embodiment 2 or 3.

Embodiment 5

In Embodiment 5, a method in which multiple execution start buttons are provided to be pressed in S908 in FIG. 9 to determine the function to be executed in accordance with the type of the pressed execution start button. In the present embodiment, as an example, a case of including two types of execution buttons is described.

Figure 18:
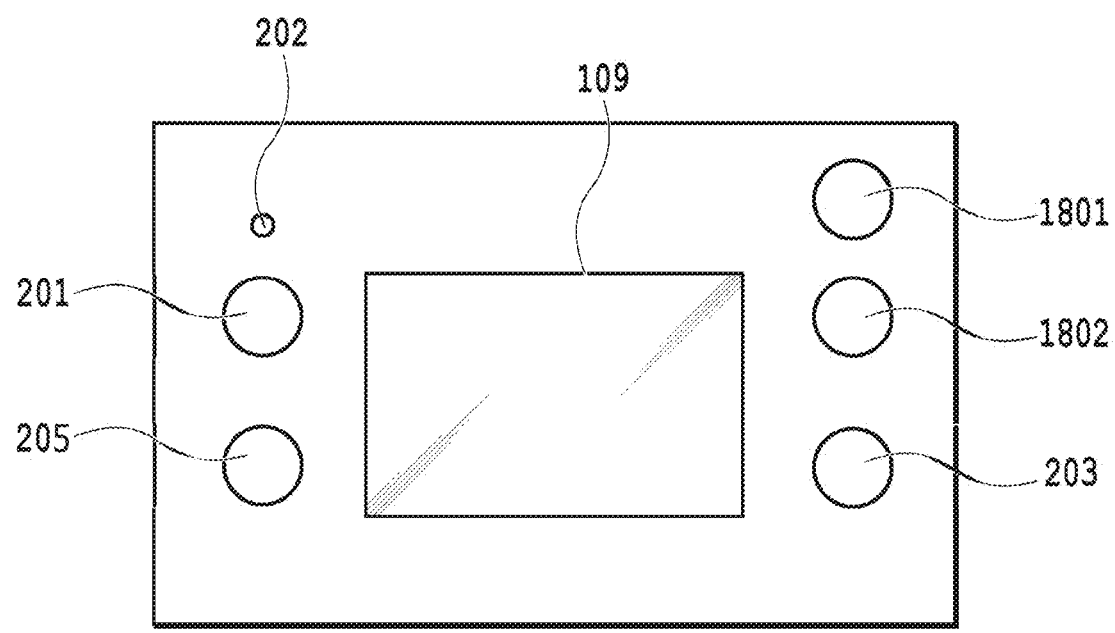
FIG. 18 is a diagram illustrating an operation display unit of the MFP.

FIG. 18 is a diagram illustrating an operation display unit of the present embodiment. The operation display unit illustrated in FIG. 18 includes a color start button 1801 and a monochrome start button 1802. In the present embodiment, once the color start button 1801 is pressed, a normal mode transitions to a color mode, and the function to be executed thereafter is limited to a function executable in the color mode. On the other hand, once the monochrome start button 1802 is pressed, the normal mode transitions to a monochrome mode, and the function to be executed thereafter is limited to a function executable in the monochrome mode. Note that, the rest of the configuration is similar to the operation display unit illustrated in FIG. 2.

In the present embodiment, as with the above-described embodiment, the CPU 101 determines the function to be executed in a case where the execution button is pressed while no function is selected on the home screen. However, it is different from the above-described embodiment in that the function to be executed is determined depending on whether the color start button 1801 is pressed or the monochrome start button 1802 is pressed in a case where the execution button is pressed.

Figure 19:
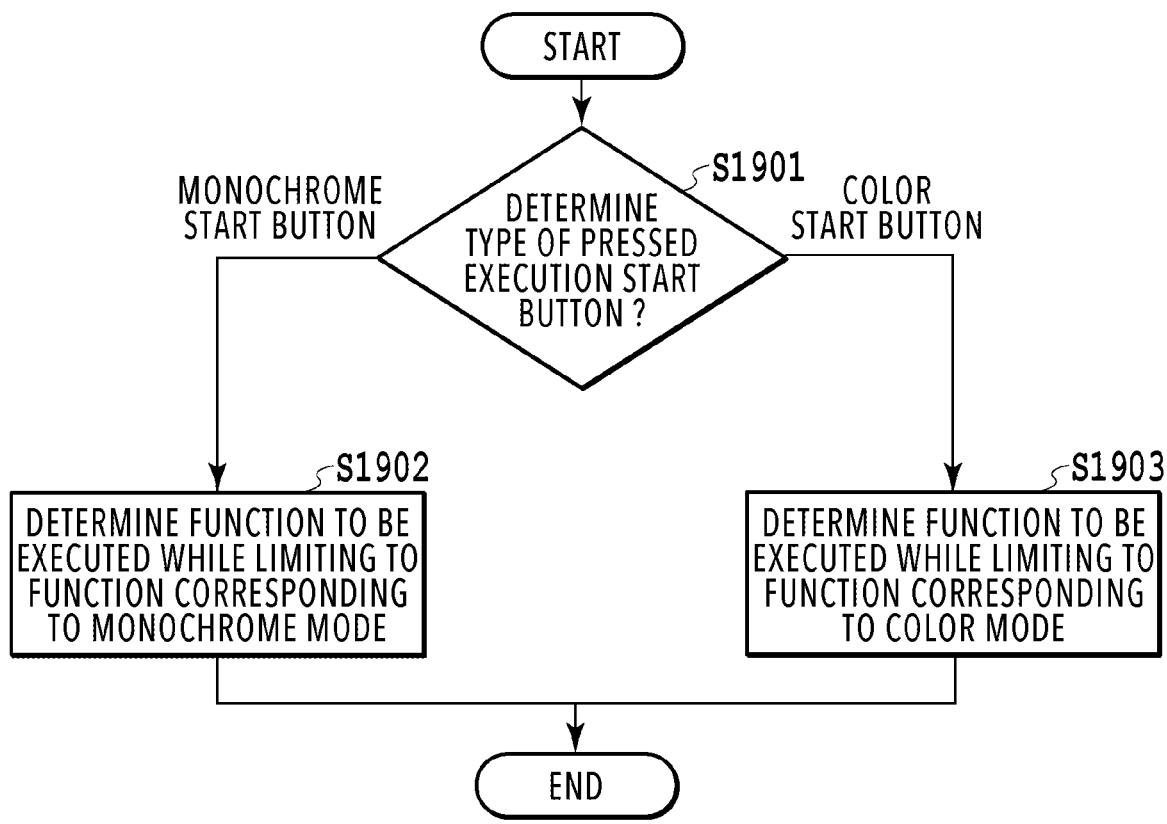
FIG. 19 is a flowchart illustrating a method of determining the function to be executed in a case where the execution start button is pressed.

FIG. 19 is a flowchart illustrating the processing performed in S908 in FIG. 9 in the present embodiment.

First, in S1901, the CPU 101 determines whether the execution button pressed in S805 is the color start button 1801 or the monochrome start button 1802. In S1901, if it is determined that the color start button 1801 is pressed, the CPU 101 allows the process to proceed to S1903, and if it is determined that the monochrome start button 1802 is pressed, the CPU 101 allows the process to proceed to S1902.

In S1903, the CPU 101 targets a function corresponding to the color mode out of the specific type functions arranged on the home screen to determine the function to be executed and ends the processing of the present flowchart. The function corresponding to the color start button 1801 is a function corresponding to color copying, for example.

In S1902, the CPU 101 targets a function corresponding to the monochrome mode out of the specific type functions arranged on the home screen to determine the function to be executed and ends the processing of the present flowchart. The function corresponding to the monochrome start button is a function corresponding to monochrome copying, for example.

The determination of the function to be executed in S1903 and S1902 is performed according to any one of the flows of Embodiments 1 to 4. The targeted function in this case is limited depending on whether which of the color start button 1801 and the monochrome start button 1802 is pressed.

Note that, although an example of using the two types of execution buttons, the color start button and the monochrome start button, is described in the present embodiment, it is not limited to these two execution buttons. A configuration in which multiple execution start units are included, and the function to be executed is determined while limiting to only a function corresponding to each execution start unit may be applicable.

As described above, on the function selection screen including the multiple execution buttons and the executable functions arranged, the function to be executed is determined from the limited functions corresponding to the type of the execution button operated on each screen. This makes it possible to execute the function with short steps in accordance with the processing that the user desires. Particularly for an MFP machine corresponding to color printing and monochrome printing that are often used depending on a state, it is possible to execute an optimal function in accordance with the state with short steps.

Other Embodiments

The above-described Embodiments 1 to 5 may be implemented in combination as needed. For example, with a combination of Embodiments 2 and 3, there may be applicable a mode to determine the function to be executed based on the execution history and the number of times of execution of the functions.

Additionally, although it is described that the specific type function is copying in the above-described embodiment, it is not limited thereto. For example, scanning may be applicable. In a case of scanning, a so-called SEND function to transmit scanned data to a transmission destination set in advance in a case where the execution start button is pressed with no function being selected may be set as a default function. In addition, the specific type function may be a function other than copying or scanning.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127044, filed Aug. 9, 2022 which is hereby incorporated by reference herein in its entirety.

What is claimed is:

1. An information processing apparatus comprising:
   at least one memory; and
   at least one processor and/or circuit which functions as:
      a display control unit that can switch between a first home screen that includes a plurality of buttons to execute a function and on which a button to execute any of the functions can be selected and a second home screen that is a home screen capable of displaying a plurality of buttons to execute a function, which buttons are selected by a user and on which a button to execute any of the functions can be selected, wherein the display control unit can display the first home screen or the second home screen on a display unit; and
      an execute unit that executes any of the functions of the information processing apparatus,
      wherein the execute unit executes a copying function in a case where a function execution button to start execution of any of the functions included in the information processing apparatus is operated in a state where the first home screen is displayed by the display control unit and the button to execute the function is not selected on the first home screen, and executes a predetermined function based on the predetermined function being arranged at a predetermined position on the second home screen in a case where the function execution button is operated in a state where the second home screen is displayed by the display control unit and the button to execute the function is not selected on the second home screen.

2. The information processing apparatus according to claim 1,
wherein the execute unit executes a function corresponding to a selected button to execute the function on the first home screen or the second home screen.

3. The information processing apparatus according to claim 1, wherein
the execute unit determines a default function to be the function to be executed and executes the default function if no button to execute the predetermined function is arranged on the second home screen.

4. The information processing apparatus according to claim 3, wherein
the default function is default copying.

5. The information processing apparatus according to claim 1, wherein
in a case where only one button to execute the predetermined function is arranged on the second home screen, the execute unit determines a function corresponding to the button to execute the predetermined function to be the function to be executed, and executes the predetermined function.

6. The information processing apparatus according to claim 1, wherein
in a case where a plurality of buttons to execute the predetermined function are arranged in a vertical direction on the second home screen, the execute unit determines a function corresponding to a button arranged on the top of the button to execute the predetermined function to be the function to be executed, and executes a function corresponding to the button arranged on the top of the button to execute the predetermined function.

7. The information processing apparatus according to claim 1, further comprising:
an obtainment unit that obtains history information of a function executed in the information processing apparatus, wherein
in a case where a plurality of buttons to execute the predetermined function are arranged on the second home screen, the execute unit refers to the history information and determines the predetermined function executed last to be the function to be executed and executes the predetermined function last executed.

8. The information processing apparatus according to claim 1, further comprising:
a counting unit that counts the number of times of execution of the function executed in the information processing apparatus, wherein
in a case where a plurality of buttons to execute the predetermined function are arranged on the second home screen, the execute unit determines the predetermined function with the greatest number of times of execution to be the function to be executed and executes the predetermined function with the greatest number of times of execution.

9. The information processing apparatus according to claim 1, wherein
in a case where a plurality of buttons to execute the predetermined function are arranged on the second home screen, only the predetermined function is displayed, and the execute unit determines a function selected by a user from the displayed function to be the function to be executed and executes the function selected by the user from the displayed function.

10. The information processing apparatus according to claim 1, wherein
in a case where a predetermined execution button is operated, the execute unit determines that the execution operation is received and executes any of the functions.

11. The information processing apparatus according to claim 10, wherein
a plurality of the predetermined execution buttons are provided in accordance with modes, and
the execute unit limits the function to be executed to the predetermined function corresponding to a mode in accordance with the operated execution button and determines and executes the predetermined function.

12. The information processing apparatus according to claim 11, wherein
in a case where the mode is a color mode, the execute unit limits the function to be executed to a function related to color copying and determines and executes the function related to color copying.

13. The information processing apparatus according to claim 11, wherein
in a case where the mode is a monochrome mode, the execute unit limits the function to be executed to a function related to monochrome copying and determines and executes the function related to monochrome copying.

14. The information processing apparatus according to claim 1, wherein
there are a plurality of the second home screens on which different buttons to execute functions are arranged, respectively.

15. The information processing apparatus according to claim 14, wherein
the plurality of the second home screens are switchable with a user operating a tab.

16. The information processing apparatus according to claim 1, further comprising:
a holding unit that displays a home screen displayed a last time in activation of the information processing apparatus.

17. The information processing apparatus according to claim 1, wherein
the predetermined function is a function related to a copying function.

18. The information processing apparatus according to claim 1, wherein
the displaying control unit displays the first home screen on the display unit in a case where a power supply of the information processing apparatus transitions to an OFF state in a state where the first home screen is displayed on the display unit and then the power supply of the information processing apparatus transitions to an ON state, and displays the second home screen on the display unit in a case where the power supply of the information processing apparatus transitions to the OFF state in a state where the second home screen is displayed on the display unit and then the power supply of the information processing apparatus transitions to the ON state.

19. The information processing apparatus according to claim 1, wherein the button to execute the function displayed on the first home screen is not the button selected by the user but a button determined by default.

20. The information processing apparatus according to claim 1, wherein the information processing apparatus is a printer.

21. The information processing apparatus according to claim 1, wherein the information processing apparatus is an inkjet printer.

22. A method of controlling an information processing apparatus including a function selection screen on which a function option from which an arbitrary function can be selected is arranged, comprising:

performing display control which can switch between a first home screen that includes a plurality of buttons to execute a function and on which a button to execute any of the functions can be selected and a second home screen that is a home screen capable of displaying a plurality of buttons to execute a function which buttons are selected by a user and on which a button to execute any of the functions can be selected, wherein the display control can display the first home screen or the second home screen on a display; and executing any of the functions of the information processing apparatus, wherein the executing executes a copying function in a case where a function execution button to start execution of any of the functions included in the information processing apparatus is operated in a state where the first home screen is displayed by the displaying control and the button to execute the function is not selected on the first home screen, and executes a predetermined function based on the predetermined function being arranged at a predetermined position on the second home screen in a case where the function execution button is operated in a state where the second home screen is displayed by the displaying control and the button to execute the function is not selected on the second home screen.

23. A non-transitory computer readable storage medium storing a program which functions in an information processing apparatus having at least one memory and at least one processor and/or circuit and including a function selection screen on which a function option from which an arbitrary function can be selected is arranged and causes the information processing apparatus to function as:

a display control unit that can switch between a first home screen that includes a plurality of buttons to execute a function and on which a button to execute any of the functions can be selected and a second home screen that is a home screen capable of displaying a plurality of buttons to execute a function which buttons are selected by a user and on which a button to execute any of the functions can be selected, wherein the display control unit can display the first home screen or the second home screen on a display unit, and an execute unit that executes any of the functions of the information processing apparatus;

wherein the execute control unit executes a copying function in a case where a function execution button to start the execution of any of the functions included in the information processing apparatus is operated in a state where the first home screen is displayed by the display control unit and the button to execute the function is not selected on the first home screen, and executes a predetermined function based on the predetermined function being arranged at a predetermined position on the second home screen in a case where the function execution button is operated in a state where the second home screen is displayed by the display control unit and the button to execute the function is not selected on the second home screen.

* * * * *